United States Patent [19]
Jahromi

[11] Patent Number: 5,416,768
[45] Date of Patent: May 16, 1995

[54] INTERCONNECTING COMMUNICATIONS NETWORKS

[75] Inventor: Fazlollah R. Jahromi, Chelsmford, United Kingdom

[73] Assignee: Fujitsu Limited, Kanagawa, Japan

[21] Appl. No.: 107,683
[22] PCT Filed: Dec. 21, 1992
[86] PCT No.: PCT/JP92/01673
§ 371 Date: Aug. 17, 1993
§ 102(e) Date: Aug. 17, 1993
[87] PCT Pub. No.: WO93/13615
PCT Pub. Date: Jul. 8, 1993

[30] Foreign Application Priority Data

Dec. 20, 1991 [GB] United Kingdom ............... 9127116

[51] Int. Cl.$^6$ .................... H04J 3/08; H04L 12/66
[52] U.S. Cl. .................... 370/55; 370/85.13; 370/85.14
[58] Field of Search .................... 370/55, 58.1, 85.9, 370/85.12, 85.13, 85.14, 85.15; 379/220, 268; 359/135

[56] References Cited

U.S. PATENT DOCUMENTS

| | | | |
|---|---|---|---|
| 4,967,405 | 10/1990 | Upp et al. | 370/112 X |
| 5,138,657 | 8/1992 | Colton et al. | 379/220 |
| 5,185,736 | 2/1993 | Tyrrell et al. | 370/84 X |
| 5,189,673 | 2/1993 | Burton et al. | 370/58.2 X |
| 5,216,666 | 6/1993 | Stalick | 370/16.1 |
| 5,311,501 | 5/1994 | Takatsu | 370/58.1 X |

FOREIGN PATENT DOCUMENTS

| | | |
|---|---|---|
| 62-226744 | 10/1987 | Japan . |
| 1-78548 | 3/1989 | Japan . |
| 2-2745 | 1/1990 | Japan . |
| 9114318 | 9/1991 | WIPO . |

OTHER PUBLICATIONS

Wakabayashi, T. et al., "A Synchronous DS3 Add/-Drop Multiplexer with cross connect", *IEEE Global Telecommunication conference*, vol. 2, Dec. 1, 1986, pp. 1195–1199.

Rokugo, Y. et al., "An Asynchronous DS3 Cross-Connect System with Add/Drop Capability", IEEE Global Telecommunications conference, vol. 3, No. 28, 1988, pp. 1555-1559.

"General Aspects of Digital Transmission Systems, Terminal Equipments" *CCITT Blue Book*, vol. III, Fascicle III, 4 (1989) pp. 107-174.

*Primary Examiner*—Melvin Marcelo

[57] ABSTRACT

A digital cross-connection apparatus for use in interconnecting first and second communications network (STM-N) having respective first and second pluralities of data channels, wherein information data and communications management data of the channels in each network is multiplexed together, includes an add/drop unit (TTF, TSAF, LSC), connected to the first network (STM-N) and operable selectively to extract therefrom the data of a selected channel of the first plurality of channels, and a digital switching matrix (LPX) having an output connected to the second network (STM-n) and having an output connected to the add/drop unit (TTF, TSAF, LCS) for receiving therefrom the extracted data including management data from the first network. Thus, the management data can pass through the switching matrix (LPX) to the second network so that end-to-end path monitoring between the two networks is facilitated. The apparatus may be advantageously used in interconnecting two optical ring networks, for example, where, as in the case of Synchronous Digital Hierarchy (SDH) networks, it is desired to maintain path continuity from a node of the first network to a node of the second network.

7 Claims, 22 Drawing Sheets

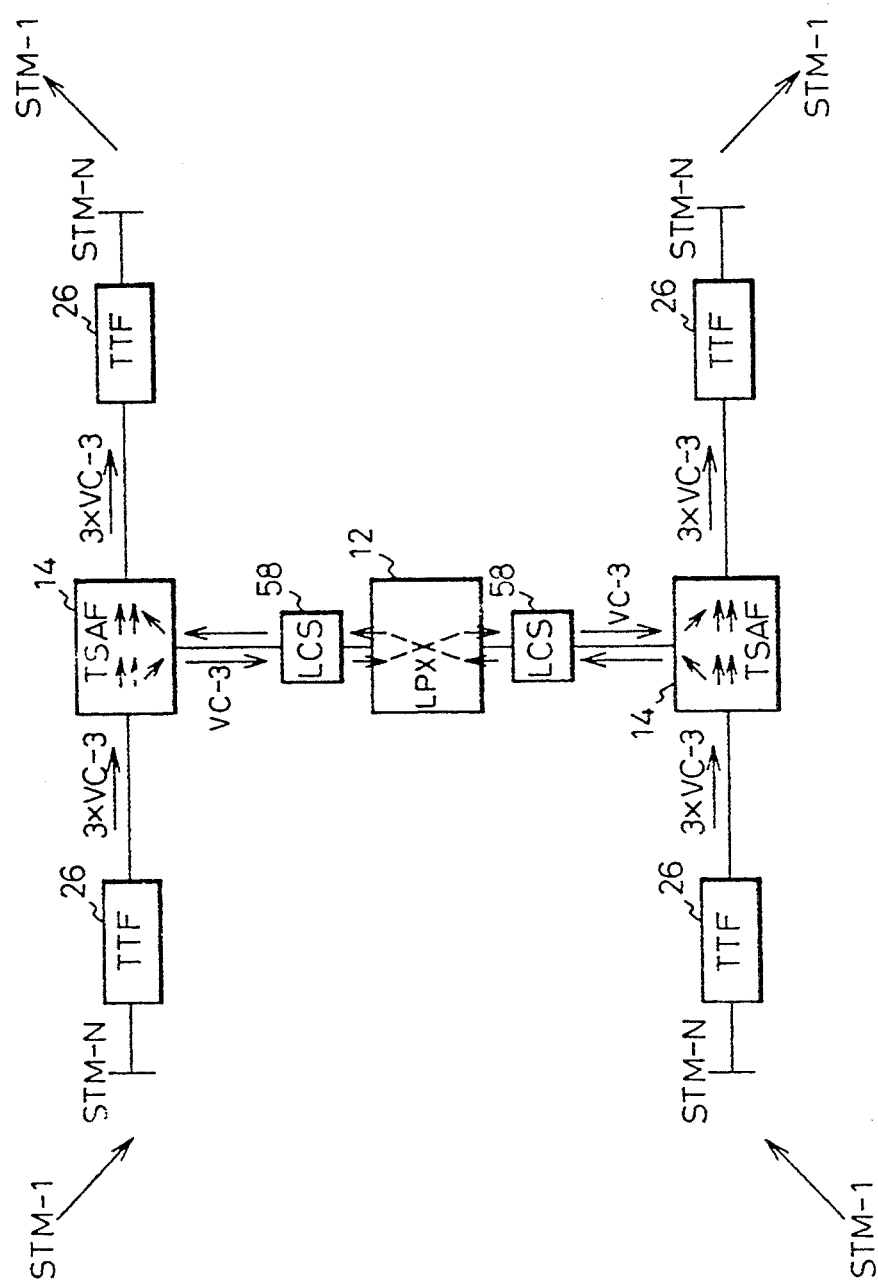

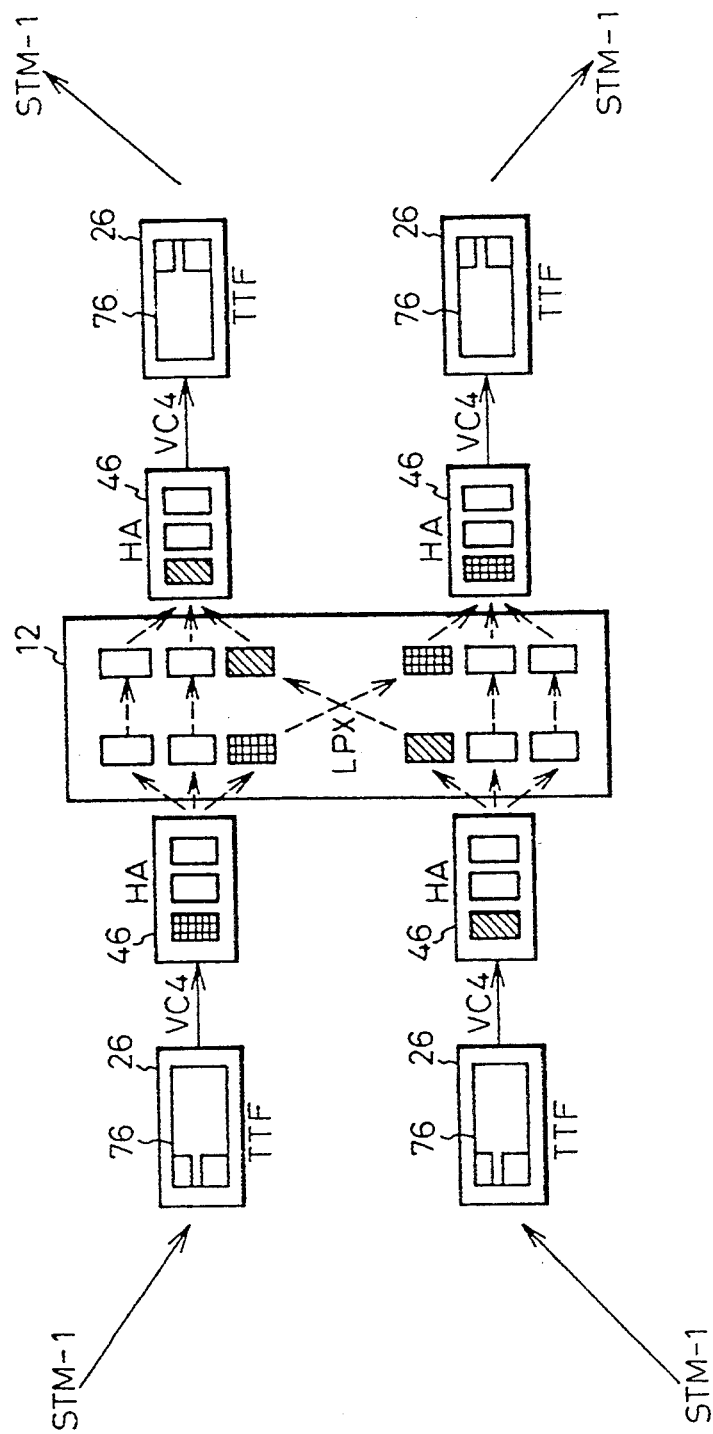

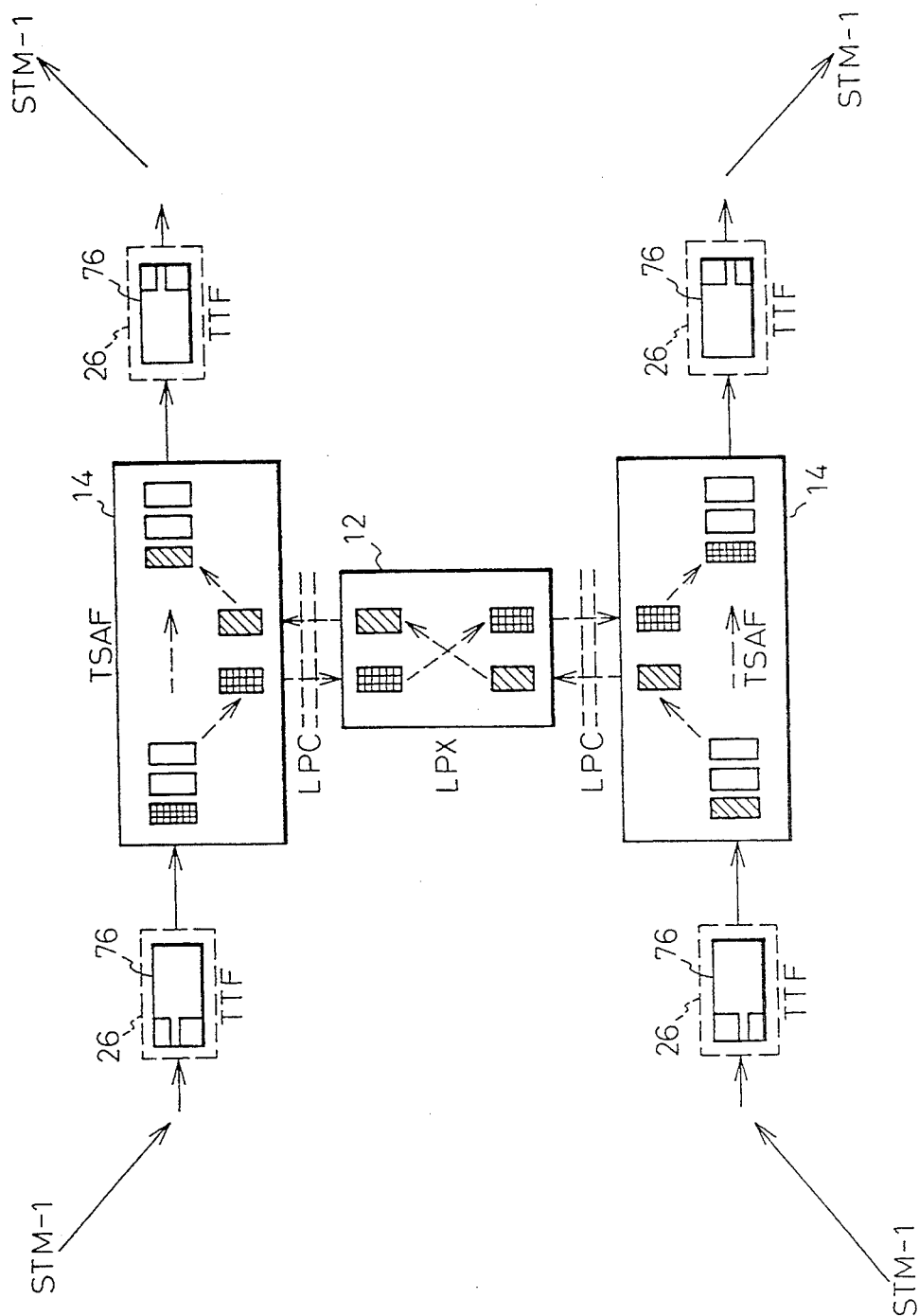

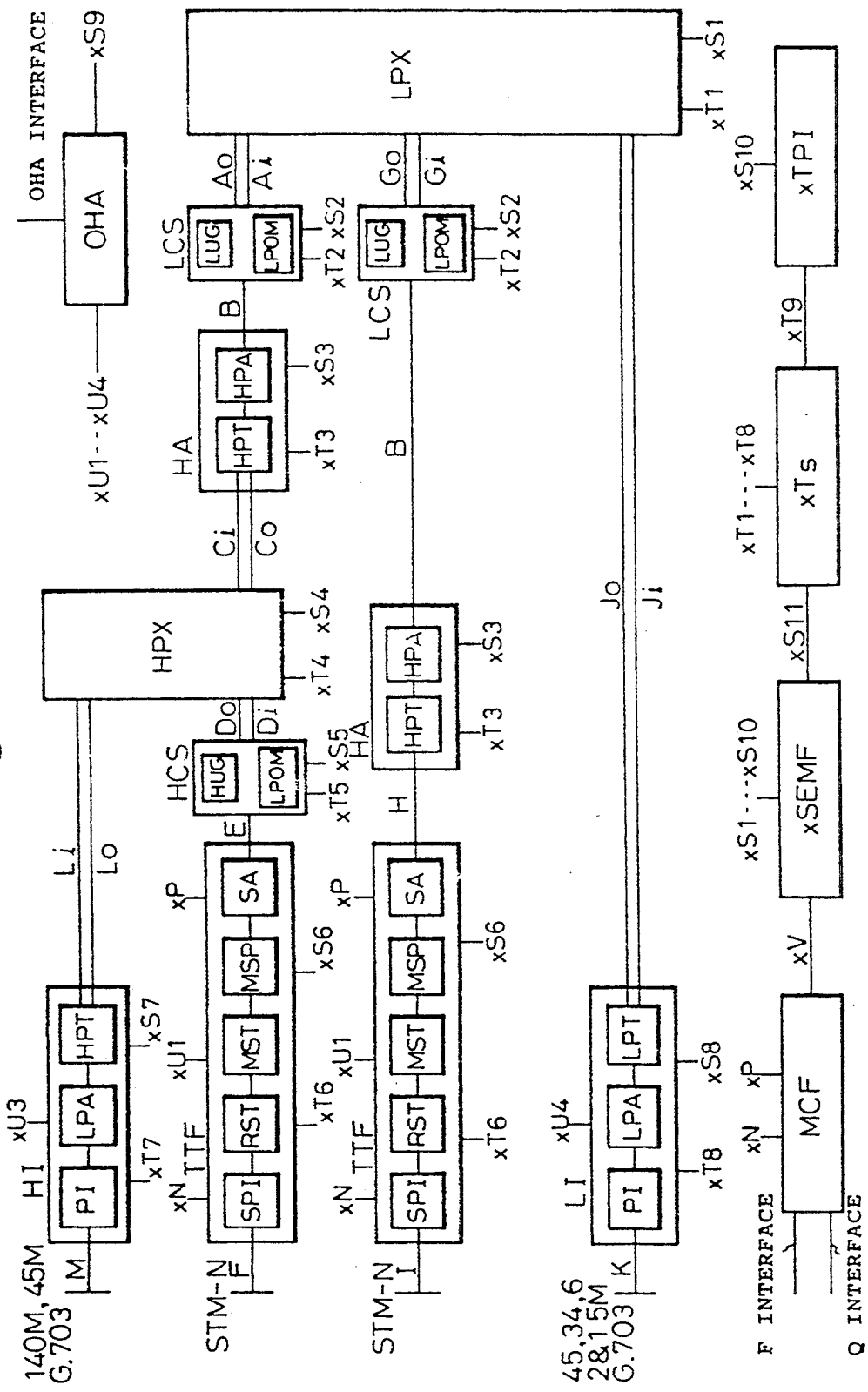

TERMINAL MULTIPLEXER

ADD/DROP MULTIPLEXER

ADD/DROP CROSS CONNECT

CROSS CONNECT

TERMINAL MULTIPLEXER

ADD/DROP CROSS CONNECT

TERMINAL MULTIPLEXER

ADD/DROP CROSS CONNECT

CROSS CONNECT

ADD/DROP CROSS CONNECT

TERMINAL MULTIPLEXER

CROSS CONNECT

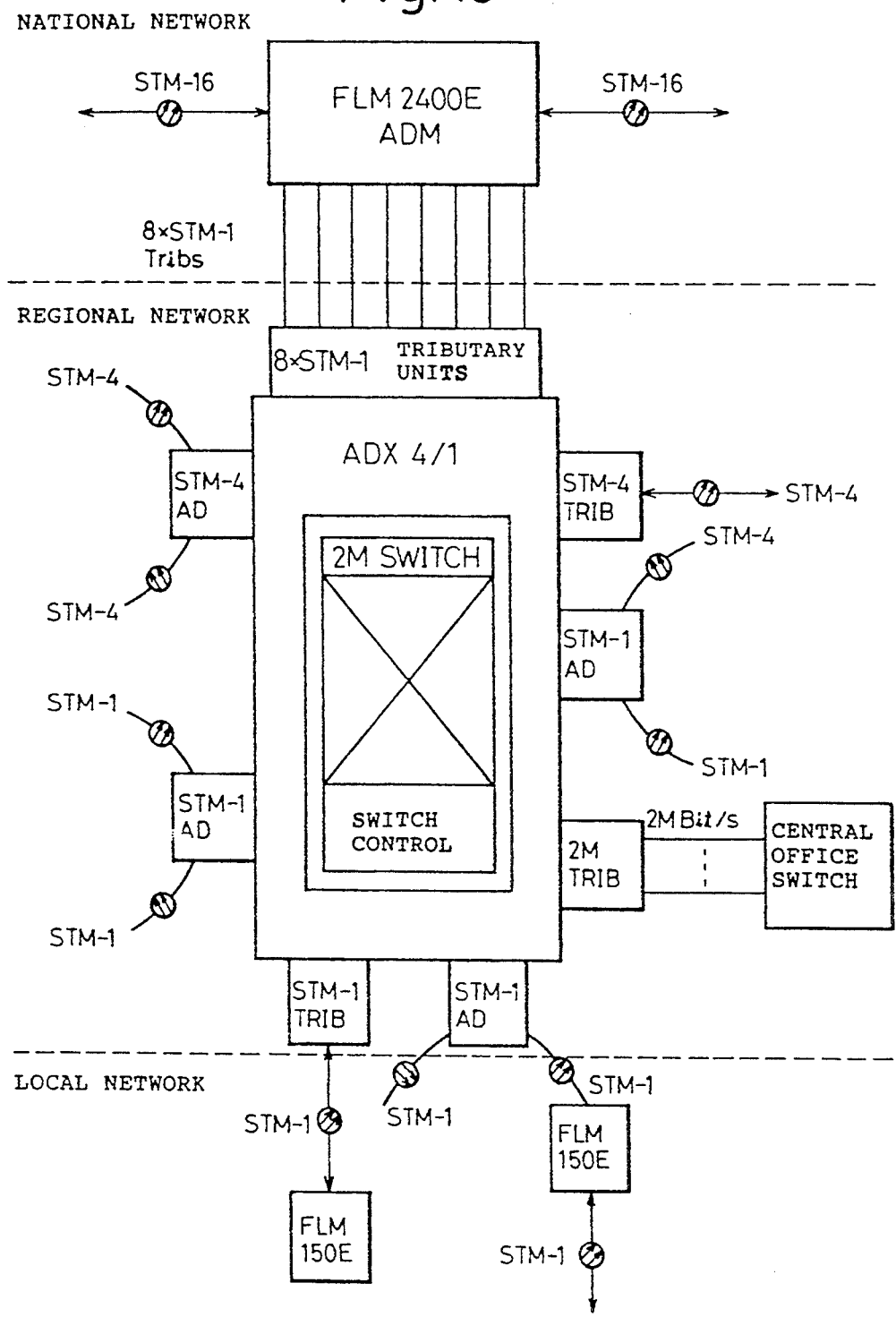

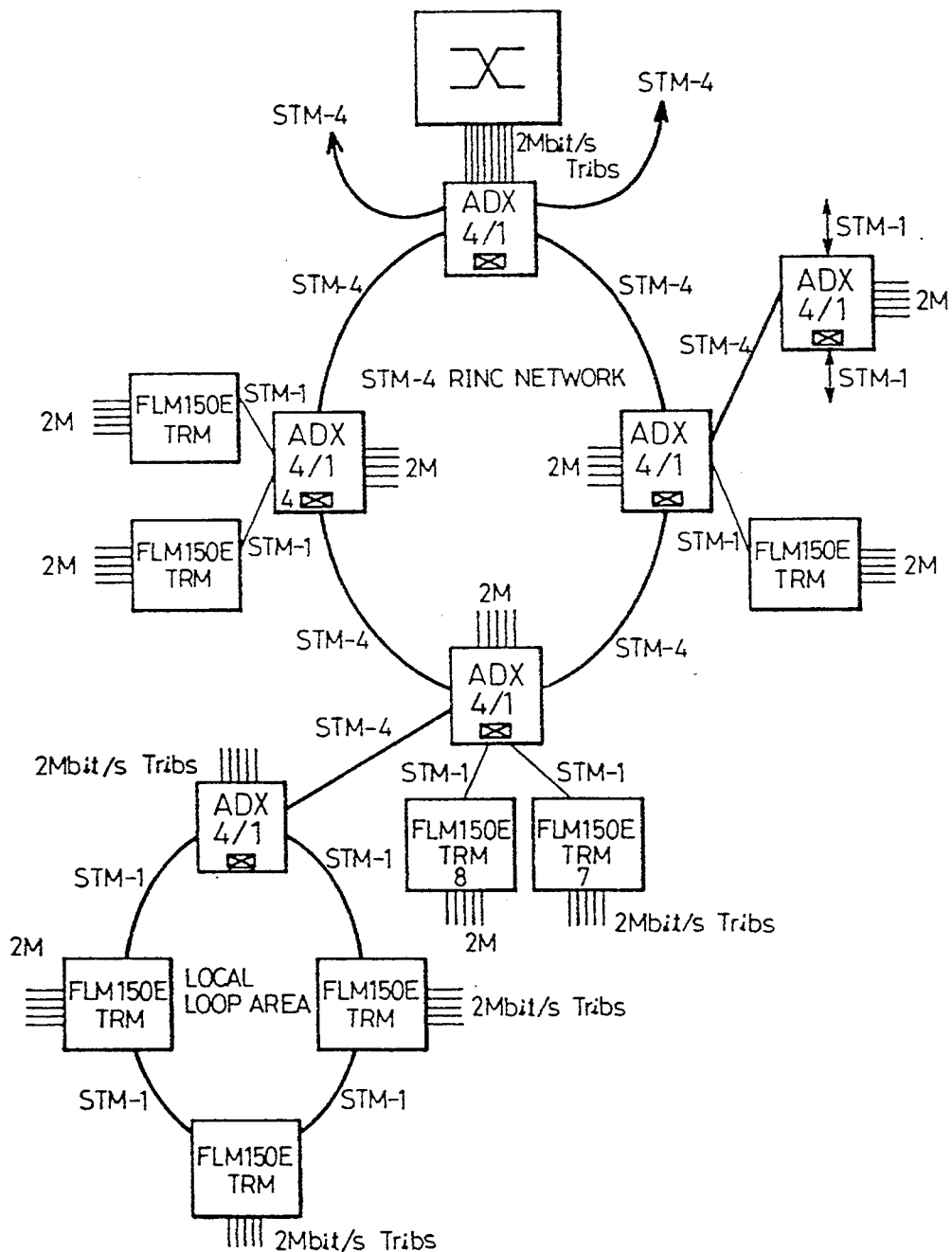

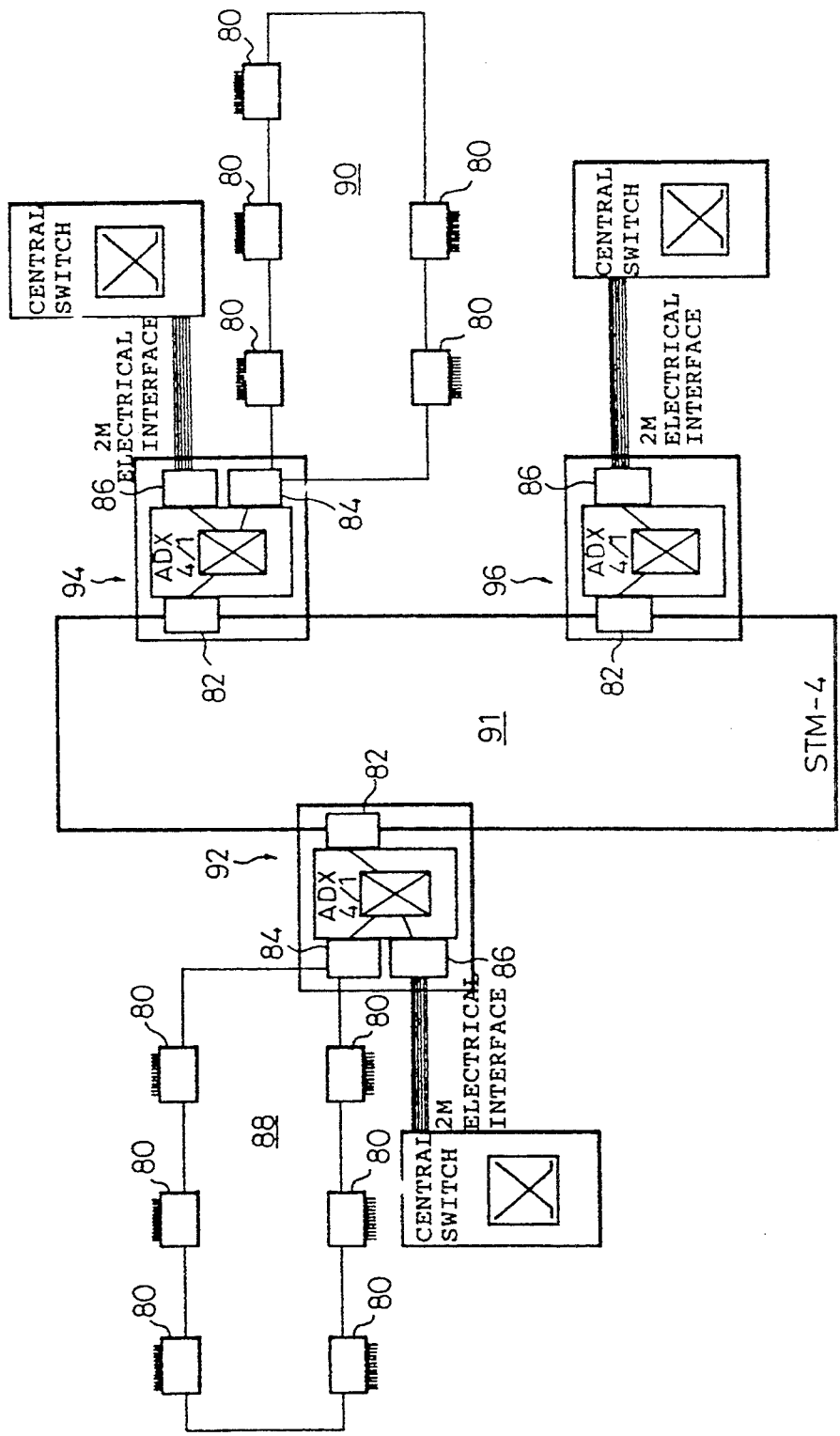

INTERCONNECTING COMMUNICATIONS NETWORKS

TECHNICAL FIELD

The present invention relates to interconnecting communications networks, and in particular the present invention relates to digital cross connect equipment.

BACKGROUND ART

The International Telegraph and Telephone Consultative Committee (CCITT) has established a set of recommendations describing the methodology for a recently-proposed digital transport network called Synchronous Digital Hierarchy (SDH).

These recommendations cover the transport frame structure, multiplexing methods, basic outlines of the equipment functionality and the means of managing this equipment. The directly relevant recommendations are: G.707, G.708, G.709, G781, G.782, G.783, G.784, G.773, G.sdx1, G.sdx2, G.sdx3, G.sna1, G.sna2, G.81s, and G.82j. Furthermore, the recommendations are backward compatible with the existing PDH recommendations of G.702, and G.703, etc.

The CCITT recommendations are concerned with functionality and are not specific to particular equipment implementation strategies. Therefore it is possible to combine several specific functional blocks to form a particular equipment type.

The present invention can provide equipment conforming to the relevant standards set out in the recommendations, and can assist in arriving at integrated system solutions to equipment design problems in particular SDH applications.

In order to allow items of communications equipment on different networks such as two optical ring networks to communicate with one another, conventionally a Digital Cross Connect element (DXC) is provided. This DXC is essentially a digital switching matrix with an operation interface for setting up relatively static connection between input and output signals or channels.

In such a conventional cross connect, as defined by the CCITT, all the interconnecting traffic from the ring networks needs to pass through the cross connect switch, and the data stream of each ring is demultiplexed into its constituent channels and these channels are then all applied to the switching matrix. Thus, even those channels of one ring that are not required to be routed through to the other ring pass through the matrix, and this gives rise to a number of problems as discussed briefly below.

Firstly, the switching capacity of the switching matrix must be large since all of the ring channels must pass through it. Commonly only a few through channels between two rings are actually required, so that the conventional DXC as outlined above is wasteful of hardware and hence expensive to install. In addition, a major problem with rings of all kinds is that if the service demand grows unexpectedly on a portion of the ring the whole ring must be re-engineered and new capacity installed. Since the conventional DXC is already expensive and inherently wasteful of capacity it is not normal to provide spare capacity, so that as the traffic on the ring increases the DXC requires expensive modification or even complete replacement.

The other problem is interconnection of several ring networks together while keeping the integrity of each ring unaffected. In this respect in the conventional DXC the constituent channels (virtual containers—VCs) are effectively terminated in the cross connect and the path overhead of the constituent VC traffic passing through the DXC must be regenerated. This presents a problem in preserving the path continuity and path monitoring from end to end as is desired in all SDH networks.

DISCLOSURE OF THE INVENTION

From a close study of network applications for SDH equipments it has now been realized that there is a need for a special type of equipment which can be successfully deployed at nodes where rings and mesh networks are interconnected. Use of conventional SDH cross connect equipments in these nodes was found to be inefficient and expensive.

An embodiment of the present invention employs the combination of the very powerful and flexible functions of Add/Drop and Cross Connect to provide a new combined functional element which will be referred to hereinafter as Add/Drop Cross Connect (ADX). In the relevant CCITT recommendations the Add/Drop function is defined for Multiplexer equipments whereas the Cross Connect function has been introduced only within the functional block description of Synchronous Digital Cross Connect equipments.

In the present application, in order to comply with the existing CCITT recommendations, wherever possible, functional blocks from two main areas of SDH technology (namely multiplexers and digital cross connects) have been used to express the concept behind the ADX.

Add/Drop functions are generally used conventionally in ring network architectures whereas Cross Connect functions are more normally used in the more complex mesh networks. Incidentally, the ability to use the ring architecture for the transmission networks has only been made possible by the recent adaption of SDH recommendations.

The ADX concept can combine the flexibility of cross connect equipments with the functionality of add/drop multiplexer equipment, when required as part of the same solution, and affords full expansion capabilities of the cross connect.

According to a first aspect of the present invention there is provided digital cross-connection apparatus, for interconnecting first and second communication networks having respective first and second pluralities of data channels, information data and communication management data of the channels in each network being multiplexed together therein, which apparatus comprises an add/drop unit, connected to the said first network and operable selectively to extract therefrom the data of a selected channel of the said first plurality, and a digital switching matrix having an output connected to the said second network and having an input connected to the said add/drop unit for receiving therefrom such extracted data including management data from the said first network, whereby such management data can pass through the said switching matrix to the said second network so that end-to-end path monitoring between the two networks is facilitated.

In such apparatus, the management information of the channels passing through the switching matrix is not stripped (disassembled) therefrom, so that it is not necessary to regenerate this information at the output side of the switching means. This enables better path continuity from a node on one ring to a node on another ring to be maintained, thereby facilitating reliable end-to-end path monitoring.

In addition, the particular combination of functional elements provides savings in circuitry and hence cost.

According to a second aspect of the present invention there is provided digital cross connect apparatus for interconnecting first and second communication networks carrying respectively first and second data streams including first and second pluralities of data channels, which apparatus includes:

first add/drop means for interposition in the first network;

second add/drop means for interposition in the second network; and switching means connected between the said first and second add/drop means for passing data therebetween;

the said first add/drop means being operable to selectively drop from the first data stream the data of a preselected data channel of the said first plurality, which dropped data is passed via the said switching means to the said second add/drop means for addition thereby to the said second data stream; and the said second add/drop means being operable to selectively drop from the second data stream the data of a preselected data channel of the said second plurality, which dropped data is passed via the said switching means to the said first add/drop means for addition thereby to the said first data stream;

the apparatus being such that management information relating to the dropped channels of the said first and second data streams is maintained and passes through the said switching means, so that path continuity for such channels is preserved, whereby end-to-end path monitoring of each network is facilitated.

One of the major applications of ADX equipment embodying the present invention will be as a gateway node element for connection of traffic from several rings and also connection of transmission traffic to other network elements.

One of the major advantages of ADX equipment embodying the present invention over conventional multiplexers or Cross Connect equipments is that it is possible for the ring traffic integrity to be preserved and for only the required selection of traffic channels to pass through the cross connect switch. This will have implications in simplifying the management and control of the network.

This clear differentiation of the local loop traffic from the ring interconnection traffic is a major advantage of the ADX approach.

When interconnecting two rings, often not all (for example only 50%) of the traffic channels of one ring are required to be routed through to the other ring. In a preferred embodiment of the present invention, because only the through channels need to be applied to the switching means the capacity of those means can be smaller than in a conventional DXC in which all of the channels of each ring are applied to the switch, i.e. local-only (non-through) channels are applied to the switching means.

BRIEF DESCRIPTION OF THE DRAWINGS

FIG. 4B is a detailed block diagram of the Add/Drop Cross Connect of FIG. 3B;

FIG. 5A is a diagram for illustrating an example of the operation of the conventional cross connect of FIG. 3A;

FIG. 5B is a diagram for illustrating a corresponding example of the operation of the Add/Drop cross connect of FIG. 3B;

FIG. 7 is a more detailed functional block diagram corresponding to FIG. 6 (for comparison with FIG. 2);

FIG. 13 is a schematic diagram illustrating use of ADX equipment embodying the present invention as a gateway node for local, regional and national network traffic;

FIG. 14 is a schematic diagram illustrating an example of the use of ADX equipment embodying the present invention in interconnecting ring networks and other network elements; and FIG. 15 is a schematic diagram illustrating an example of the use of ADX equipment embodying the present invention for the interconnection of three ring networks to central office switching equipments;

BEST MODE FOR CARRYING OUT THE INVENTION

Figure 1:
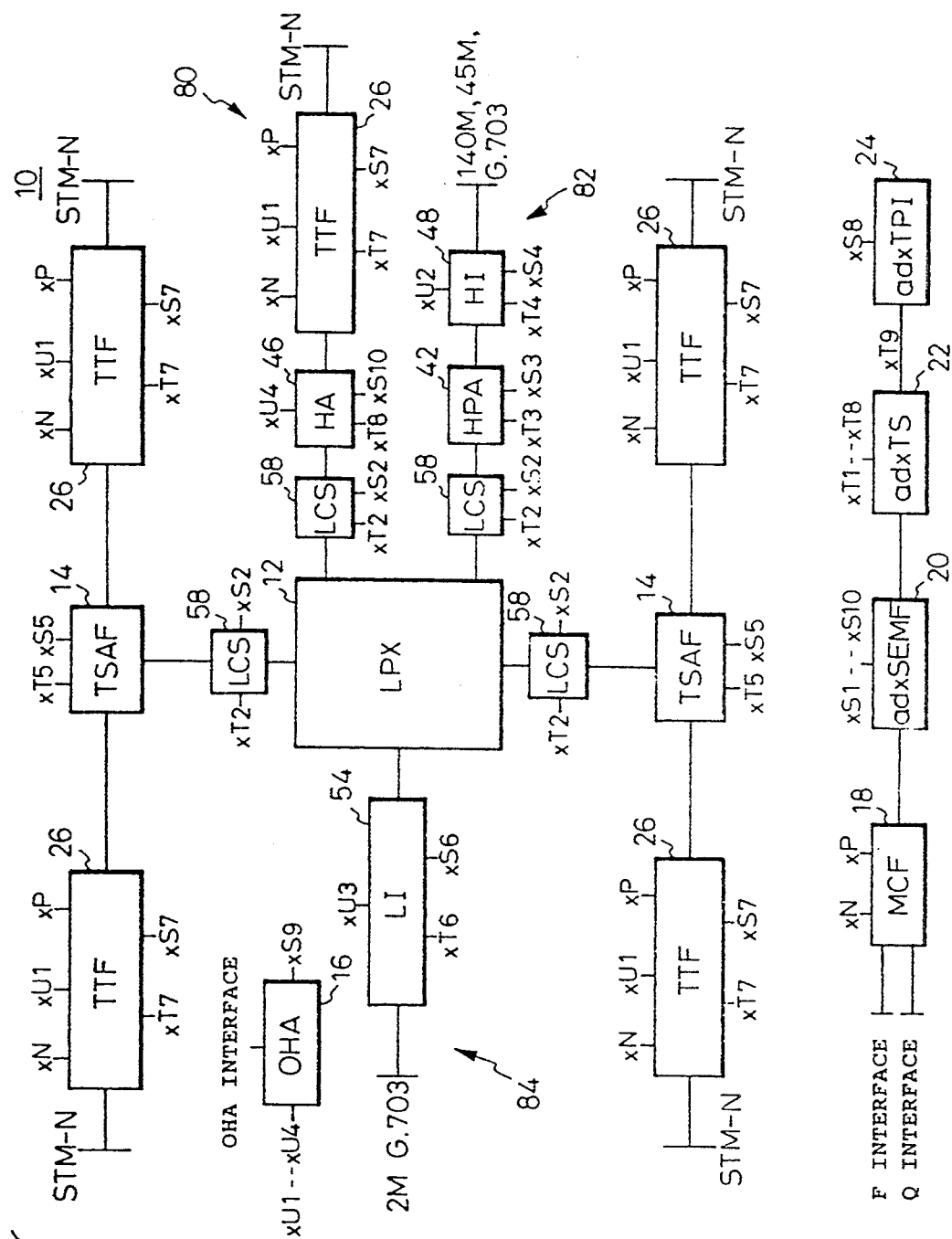
FIG. 1 is a functional block diagram of an Add/Drop Cross Connect (ADX) embodying the present invention.

FIG. 1 illustrates the proposed functional architecture for ADX equipment 10 embodying the present invention, wherein the switching unit LPX (Lower Order Path Cross Connection) 12 acts as the central unit for switching of the transmission traffic channels to the required direction.

The virtual container (VC) paths are interconnected through the cross connect of FIG. 1 without needing to terminate and regenerate the path overhead of the constituent VC traffic passing through the ADX. This is important in preserving the path continuity and path monitoring from end to end as is desired in all SDH networks.

The Time Slot Assignment Function (TSAF) 14 enables selection of appropriate channels for the SDH frame for cross connection in the LPX 12 without needing to demultiplex and terminate all the incoming traffic channels, as in the case with a conventional cross connect (DXC). More efficient use of the switch facility is made since only the paths that are cross connected between the different networks are passed through the LPX 12.

As defined in the CCITT 1988 recommendations G.781, G.782, G.783 and G.sdxc-3, Overhead Access Function (OHA) 16 provides access in an integrated manner to the transmission overhead functions where necessary. Message Communication Function (MCF) 18 receives and buffers messages from the Data Communication Channels (DCCs), Q-and F-interfaces and adx (SEME) 20. ADX Synchronous Equipment Management Function (adxSEMF) 20 converts performance data and implementation specific hardware alarms into object orientated messages for transmission on the DCCs and or a Q interface. It also converts object oriented messages related to other management functions for passing across the Sn reference points. ADX Timing Source function (adx TS) 22 provides timing reference to appropriate functional blocks as indicated in FIG. 1. This function includes an internal oscillator function and ADX timing generator function. ADX Timing Physical Interface (adx TPI) 24 provides the interface between the external synchronization signal and the adx TS22 and should have the physical characteristics of one of the G.703 synchronization interfaces. The other function blocks are explained with reference to FIG. 2.

Figure 2:
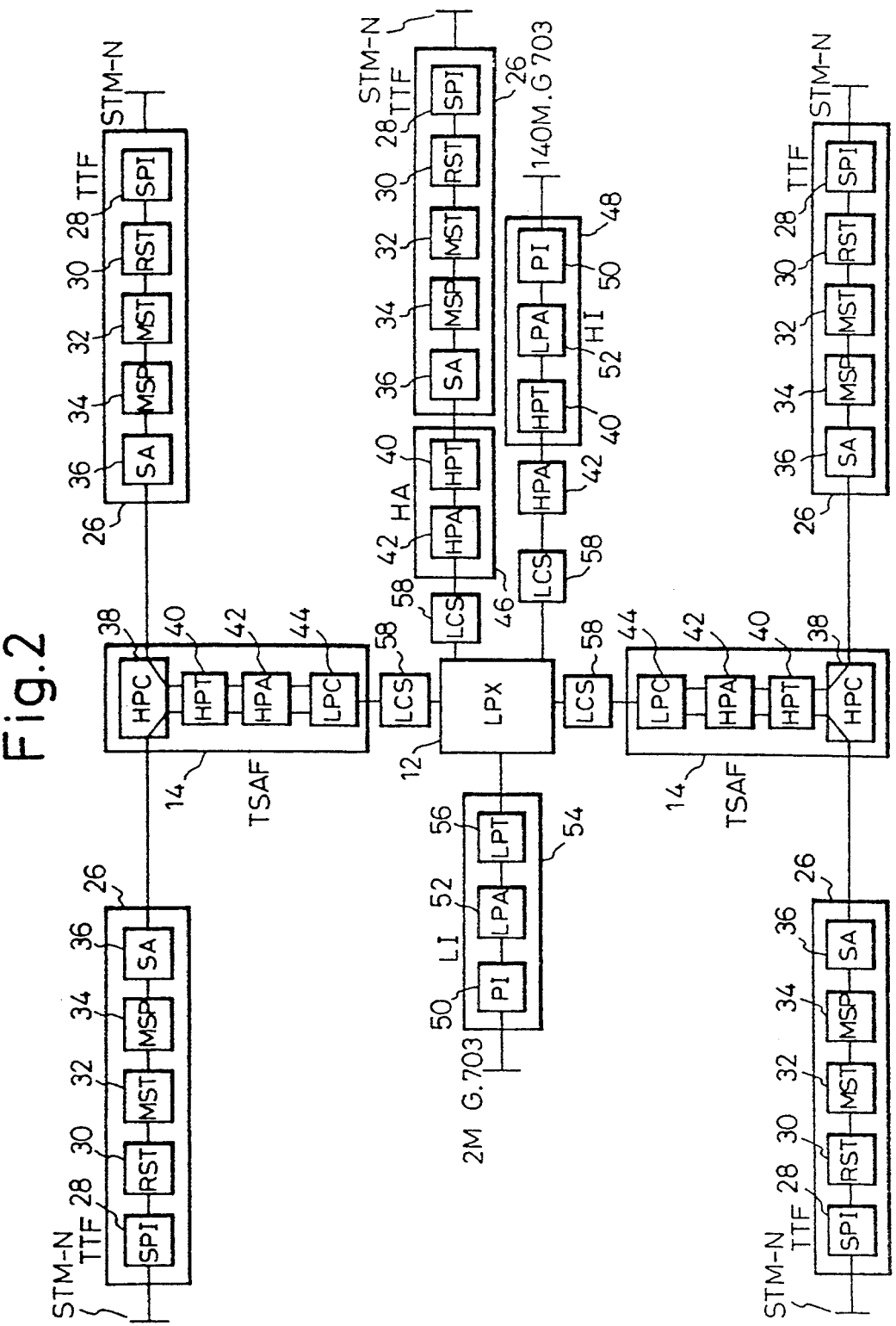
FIG. 2 is a more detailed functional block diagram corresponding to FIG. 1.

FIG. 2 illustrates the constituent functional blocks within the compound functional elements (TTF, etc.) of the ADX 10 shown in FIG. 1. Definition of the individual functional blocks illustrated in FIG. 2 can be found in CCITT recommendation G.782, and G.783.

The Transport Terminal Function (TTF) 26 includes an SDH Physical Interface (SPI) 28, a Regenerator Section Termination (RST) 30, a Multiplex Section Termination (MST) 32, a Multiplex Section Protection (MSP) 34 and a Section Adaptation (SA) 36. As defined in CCITT recommendations, the SPI 28 converts an internal logic level STM (Synchronous Transport Module)-N (N=1, 4, 16, etc.) signal into an STM-N line interface signal, and the RST 30 generates a Regenerator Section Overhead (RSOH) comprising rows 1 to 3 of a Section Overhead (SOH) of the STM-N signal in the process of forming an SDH frame signal and terminates the RSOH in the reverse direction. The MST 32 generates a Multiplex Section Overhead (MSOH) comprising rows 5 to 9 of the SOH of the STM-N signal in the process of forming an SDH frame signal and terminates the MSOH in the reverse direction. The MSP 34 provides capability for switching a signal between and including two MST functions, from a 'working' to a 'protection' section. The SA 36 process an AU-3/4 pointer to indicate the phase of the VC-3/4 path Overhead (POH) relative to the STM-N SOH and assembles/diassembles the complete STM-N frame.

The TSAF 14 includes a Higher order Path Connection (HPC) 38, a Higher order Path Termination (HPT) 40, Higher order Path Adaptation (HPA) 42, and Lower order Path Connection (LPC) 44. As defined in CCITT recommendations, the HPC 38 provides for flexible interconnection of higher order VCs (VC-3/4). The HPT 40 terminates a higher order path by generating and adding the appropriate VC POH to the relevant container at the path source and removing the VC POH and reading it at the path sink. The HPA 42 adapts a lower order VC (VC-1/2/3) to a higher order VC (VC-3/4) by processing the TU pointer which indicates the phase of the VC-1/2/3 POH relative to the VC-3/4 POH and assembling/disassembling the complete VC-3/4. The LPC 44 allows flexible interconnection of the lower order VCs (VC-1/2/3).

The Higher order Assembler (HA) 46 includes the HPT 40 and the HPA 42.

The Higher order Interface (HI) 48 includes a Physical Interface (PI) 50, a Lower order Path Adaptation (LPA) 52 and the HPT 40. The LPA 52 adapts a PDH (Plesiochronous Digital Hierarchy) signal to an SDH network by mapping/demapping the signal into/out of a synchronous container. If the signal is asynchronous, the mapping process will include bit level justification.

The Lower order Interface (LI) 54 includes the PI 50, the LPA 52 and a Lower order Path Termination (LPT) 56.

The LPT 56 terminates a lower order path by generating and adding the appropriate VC POH to the relevant container at the path source and removing the VC POH and reading it at the path sink.

The Lower order Connection Supervision (LCS) 58 enables supervision of the unassigned and assigned Lower Order connections. Since it has identical information flow across it's input and outputs it may be optional or degenerate. (LCS acts as a source and sink for parts of the lower order path overhead.)

Figure 3A:
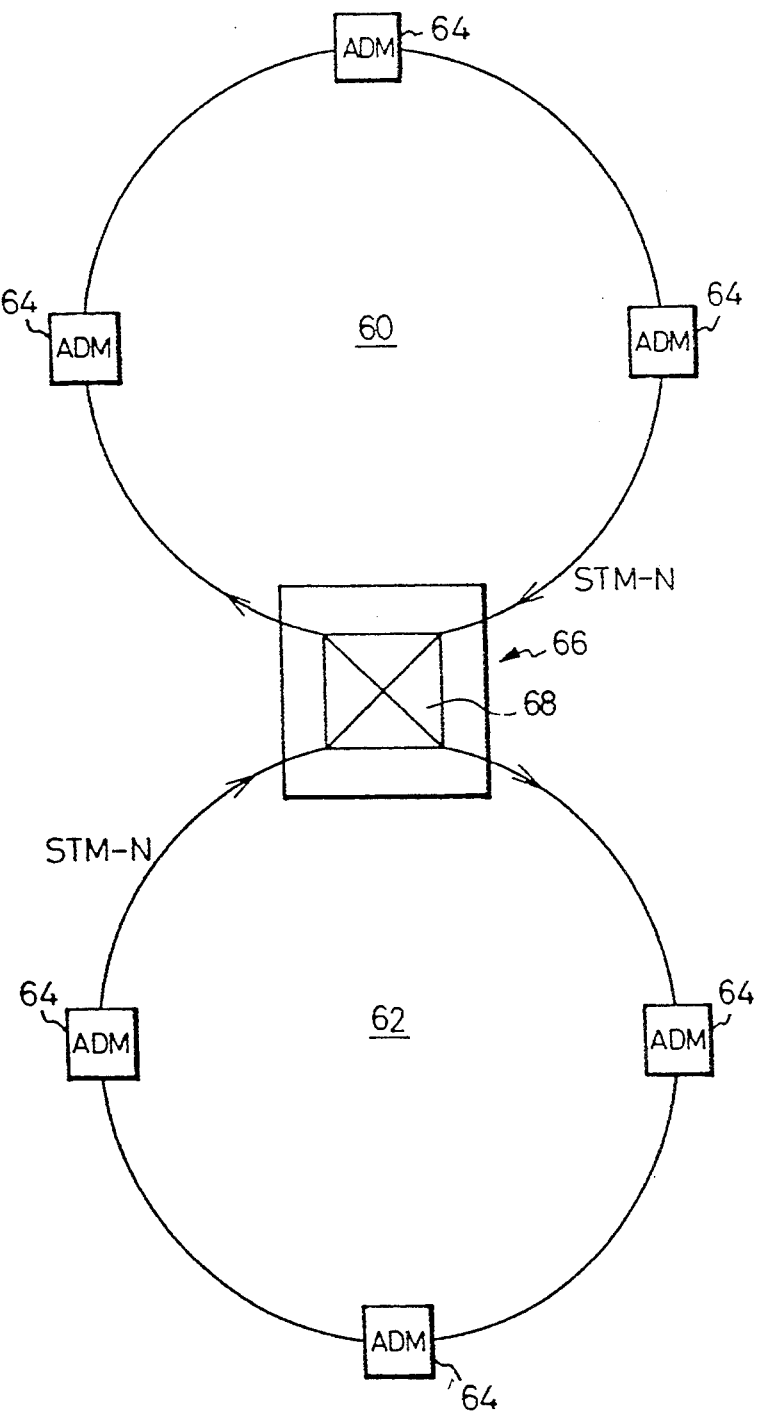
FIG. 3A is a schematic diagram of a communication system including two ring networks interconnected by means of a conventional cross connect.
Figure 3B:
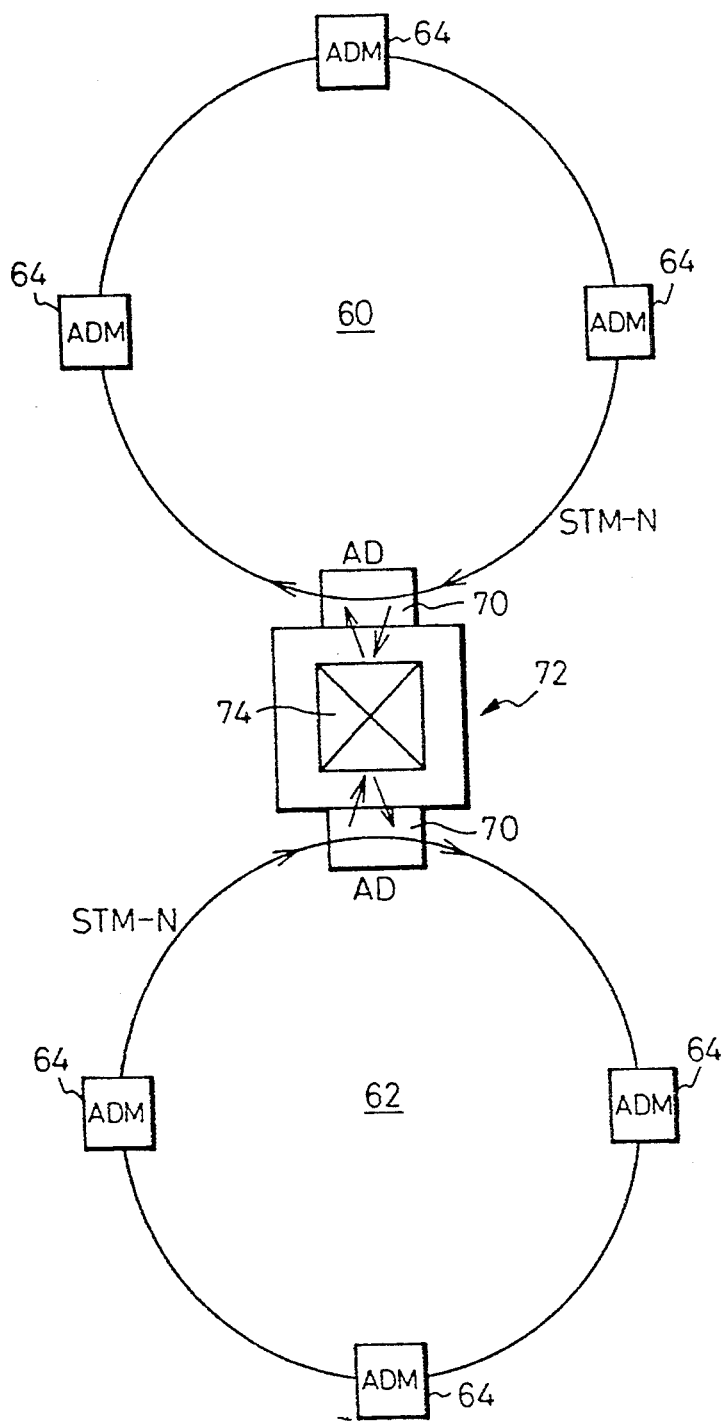
FIG. 3B is a schematic diagram corresponding to FIG. 3A, but in which the two rings are interconnected by means of an Add/Drop Cross Connect embodying the present invention.

FIGS. 3A and 3B illustrate a comparative example for explaining differences between the conventional Cross Connect DXC approach and the new Add/Drop Cross Connect ADX approach. FIG. 3A illustrates a conventional method of interconnecting two ring networks 60, 62 such as optical ring networks. Each loop 60, 62 has connected thereto a plurality of items of communications equipment (not shown), each of which is linked to its ring by an Add/Drop Multiplexer (ADM) 64. These Add/Drop Multiplexers 64 allow the items of equipment to receive (drop) data from a particular channel of the data stream carried by the ring (for example at 140 MHz) or to transmit (add) data on a particular channel.

In FIG. 3A all the ring traffic from loop 60 and loop 62 passes through Switch Matrix unit 68 of the Cross Connect 66 but in FIG. 3B only the required channels are selected by the Add/Drop unit 70 (including two TTFs 26 and a TSAF 14 shown in FIG. 1) to pass from loop 60 to loop 62 using the Switch Matrix unit 74 of the ADX 72. This has advantages in increasing the effective capacity of the Cross Connect and in simplifying control and management issues.

FIG. 4 is an expansion of the concept illustrated in FIG. 3. It is a simplified illustration of the comparison between the operation of the conventional DXC and the ADX for one level of the SDH hierarchy.

Figure 4A:
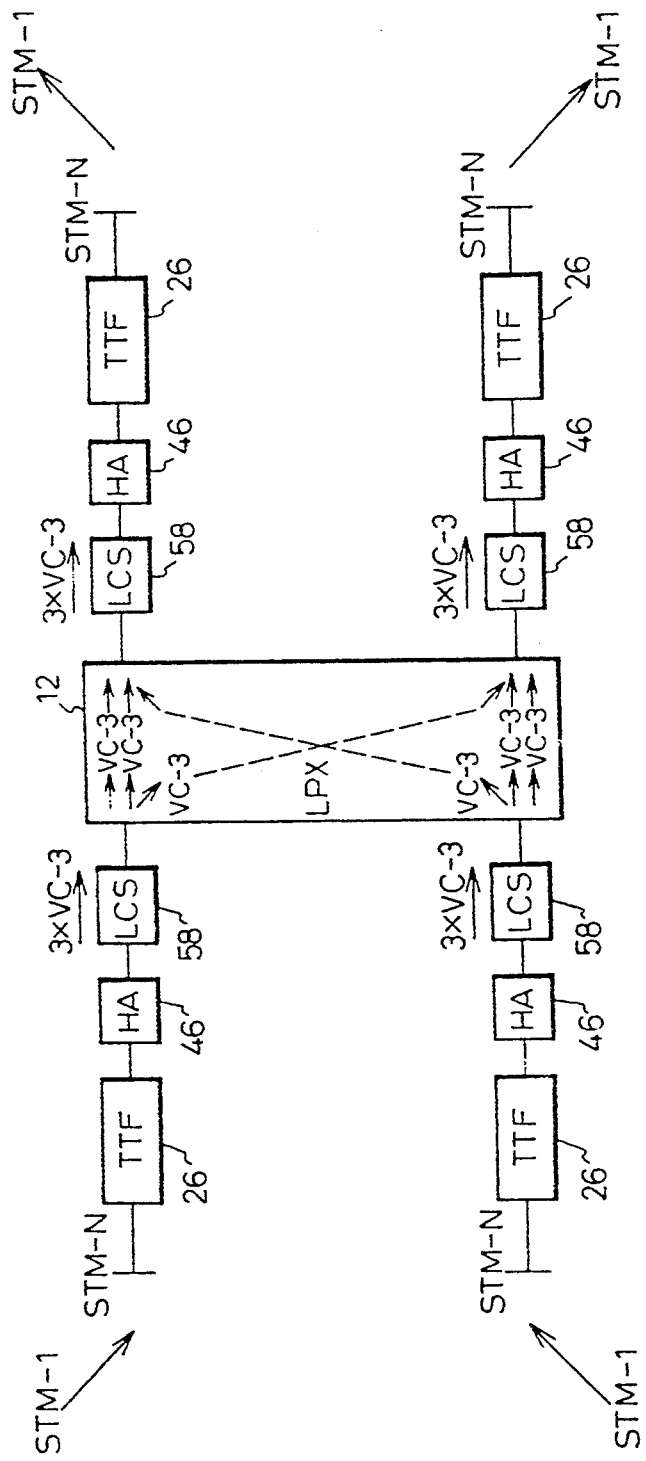
FIG. 4A is detailed block diagram of the conventional cross connect of FIG. 3A.

In this example we require to cross connect VC-3's (i.e. virtual containers of hierarchy level 3) from two STM-1 (Synchronous Transport Module type 1) rings. In FIG. 4A all the traffic from the STM-1 lines is demultiplexed to VC-3 level through TTF 26, HA 46 and LCS 58 and switched through to the appropriate output ports of the LPX (Lower Order Path Cross Connection) 12.

It can be seen that in this example 6 inputs and 6 outputs of the LPX 12 are occupied.

In FIG. 4B the traffic from STM-1 lines passes through TTF 26 and the TSAF 14 which selects only the appropriate VC-3 time slots of the STM-1 signals for cross connection through the LPX 12. It can be seen that in this particular example only 2 input and 2 output ports of the LPX 12 are occupied.

It should be noted that the advantage of ADX disappears if all the traffic channels (VC-3's) from the STM-1 lines are to be cross connected, in which case the total number of the LPX ports occupied for the ADX are the same as that of the DXC.

FIG. 5 further illustrates the same principle as FIG. 3. In FIG. 5A the STM frame 76 is processed by the TTF (Transport Terminal Function) 26 which provides access to the management information contained in the DCC (data communications channel) included in the STM frame overheads. After appropriate pointer processing by the HA (Higher Order Assembler) 46 the VC-3's are passed to the LPX 12 of the conventional DXC which carries out the switching function on all the input VC-3's and the output from the LPX 12 is multiplexed up to a VC-4 in the HA (Higher Order Assembler function) 46 and passed to the TTF function 26 for insertion of the appropriate path overhead and management information.

In FIG. 5B, on the other hand, the STM frame is processed by the TTF (transport terminal function) 26 which provides access to the management information contained in the DCC (data communications channel) included in the STM frame overheads. After pointer processing by the TSAF (Time Slot Assignment function) 14 the appropriate (shaded) VC-3 is passed to the LPX 12 of the ADX which carries out the switching function between the two VC-3's to be cross connected between the STM-1 frames. The respective VC-3's that have passed through the LPX 12 are then assembled in the appropriate output STM frame by the TSAF's 14 and sent to the TTF's 26 for insertion of the appropriate overhead and management information.

Incidentally, although it might initially be thought that a similar function to the ADX function might be achieved by direct connection of an Add/Drop Multiplexer ADM and a conventional DXC, there are practical difficulties in such direct connection such as the loss of path overhead and path continuity when interconnecting transmission traffic contained in the virtual containers. This arises, for example when interconnecting VC-12's containing 2 Mbit/s payloads from an ADM to a DXC, because the path overheads on the individual VC-12's are terminated by the multiplexer and are again regenerated by the DXC. This leads to the loss of path continuity needed for the end-to-end path monitoring carried out in all SDH networks. Also, in going from an ADM to a DXC certain functions are duplicated and this leads to an inefficient and expensive system. In the proposed ADX equipment embodying the present invention path continuity for the individual VC's is preserved and duplication of functions is avoided with the signal only going through the necessary processes. Functions such as Higher Order Path Termination (HPT), Lower Order Path Termination (LPT), Lower Order Path Adaptation (LPA), Physical Interface (PI) etc., which are normally used in an ADM, are avoided in the ADX architecture.

Furthermore, somewhat surprisingly it is found that although the ADX architecture has been generated from some of the functional blocks used in Add/Drop multiplexers and Digital Cross Connect equipment, ADX equipment embodying the invention offers more (in terms of function and flexiblity) than the mere sum of its constituent functional elements combined in conventional manner. This is because, as noted above, the ADX approach leads to savings in terms of hardware requirements and in the simplification of the management and control of the transmission network traffic.

Figure 6:
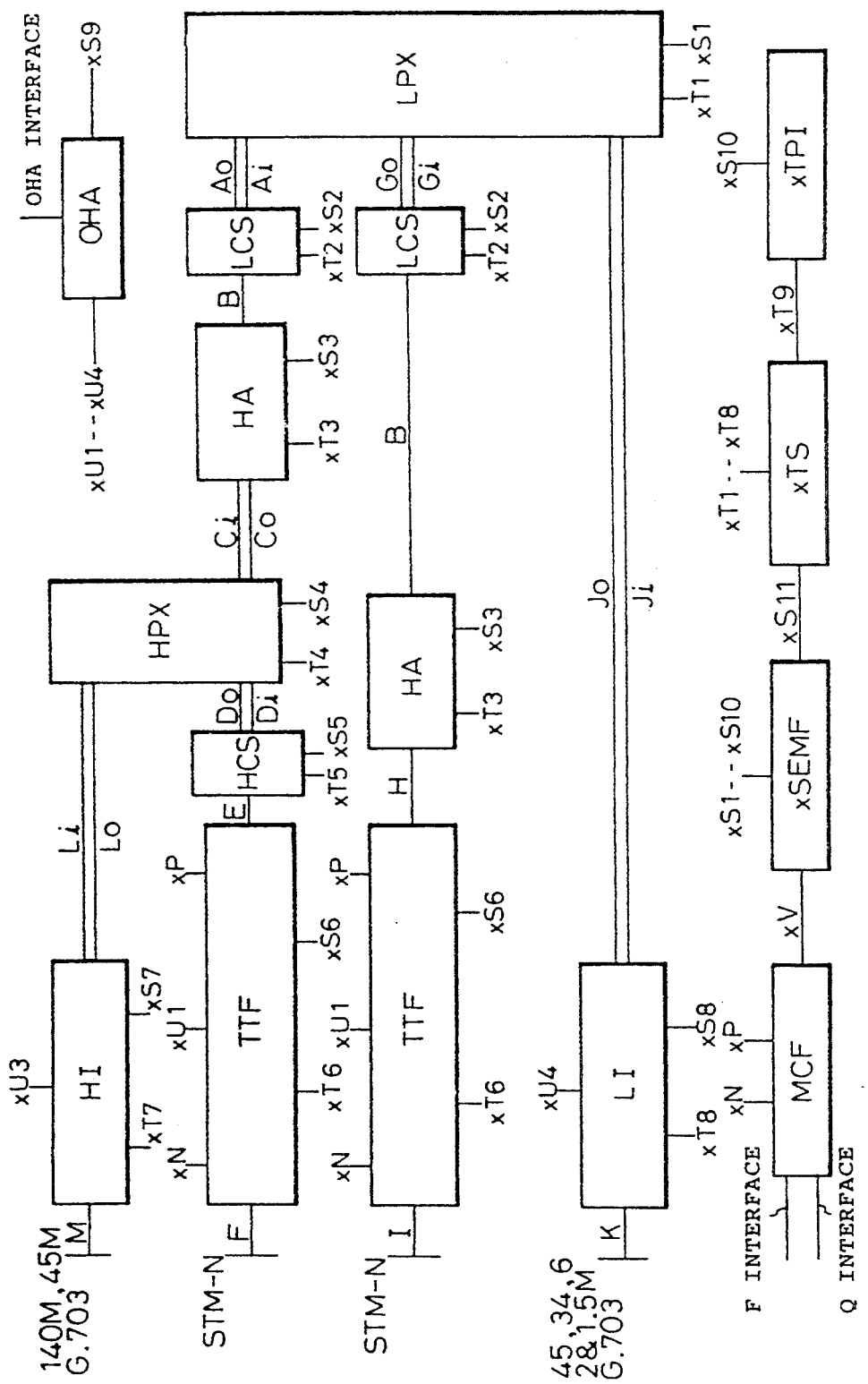
FIG. 6 is a functional block diagram of a conventional cross connect (for comparison with FIG. 1)

For comparison with the functional architecture of the ADX equipment according to the present invention, the functional architecture of a synchronous Digital Cross Connect (DXC) shown in the CCITT recommendations and the constituent functional block within the compound functional elements are shown in FIG. 6 and 7, respectively. As shown in FIGS. 6 and 7, all virtual containers from the STM-N are applied to the LPX in the DXC.

As shown in FIG. 1, besides branches of add/drop units each including two TTF 26 and a TSAF 14, three branches 80, 82 and 84 for connection with STM-N, a higher order signal and a lower order signal of G.703 are provided for the LPX 12 of the ADX equipment according to the present invention. As shown in FIGS. 8 to 10, the ADX equipment of the present invention can inplement SDH elements such as a terminal multiplexer, an add/drop multiplexer, an add/drop cross connect by utilizing these three branches and in conjunction with other line transmission equipment such as FLM 2400E, FLM 600E, and FLM 150E.

FIG. 8 illustrates some application examples of how ADX equipment embodying the invention (ADX 4/1) can be used in conjunction with Fujitsu's FLM 2400E and FLM 600E range of line transmission equipments for SDH.

Figure 8A:
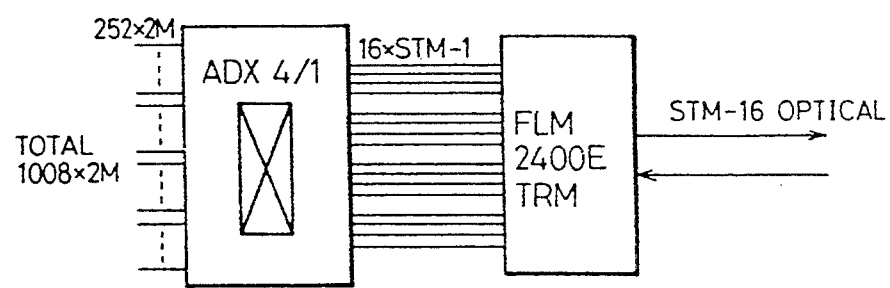
FIGS. 8A to 8D, 9A to 9C, and 10A to 10C are block diagrams illustrating the manner in which Add/Drop Cross Connect equipment embodying the present invention can be used in conjunction with SDH line transmission equipment.

FIG. 8A represents application of the ADX as a Terminal Multiplexer in which 16×STM-1 lines from FLM 2400E TRM unit are demultiplexed down to primary rate of 2 MBit/s.

Figure 8B:
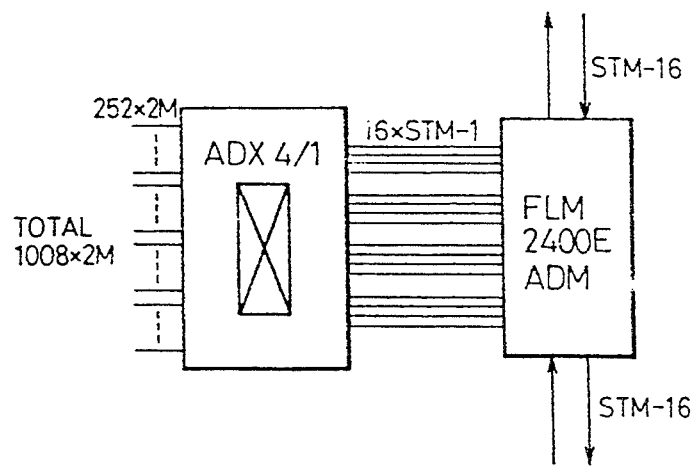

FIG. 8B represent application of the ADX as an Add/Drop Multiplexer in which 16×STM-1 lines from FLM 2400E ADM unit are demultiplexed down to primary rate of 2 MBit/s. In this application any of the 2 MBit/s channels within the main STM-16 line (Ring) can be accessed through the ADX.

Figure 8C:
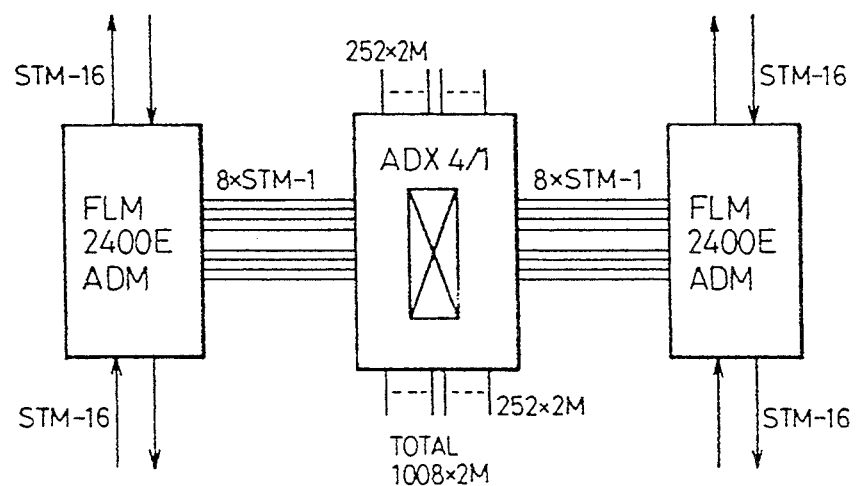

FIG. 8C represents application of the ADX as an Add/Drop Cross Connect in which 8×STM-1 lines from each of the FLM 2400E ADM units are demultiplexed down to primary rate of 2 MBit/s, and any of the 2 MBit/s channels within the 8×STM-1 frames of the main STM-16 lines (Rings) can be accessed through the ADX.

Figure 8D:
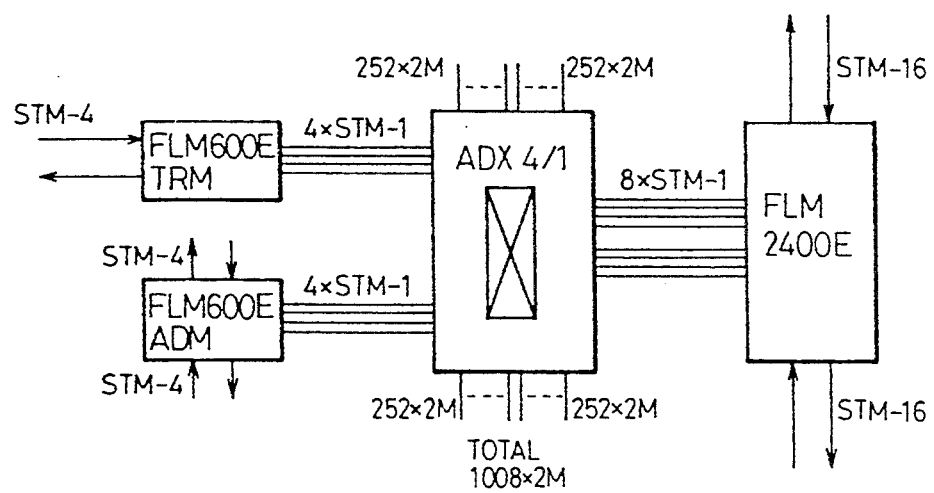

FIG. 8D represents application of the ADX as a Cross Connect in which 8×STM-1 lines from the FLM 2400E ADM unit are demultiplexed down to a primary rate of 2 MBit/s, and any of the 2 MBit/s channels within 8×STM-1 frames of the main STM-16 line (Rings) can be accessed through the ADX. The traffic from the FLM 2400E ADM can also be interconnected to selected traffic channels from the two FLM 600E TRM and ADM units.

FIG. 9 illustrates some application examples of how ADX equipment embodying the invention (ADX 4/1) can be used in conjunction with Fujitsu's FLM 600E and FLM 150E range of line transmission equipments for SDH.

Figure 9A:
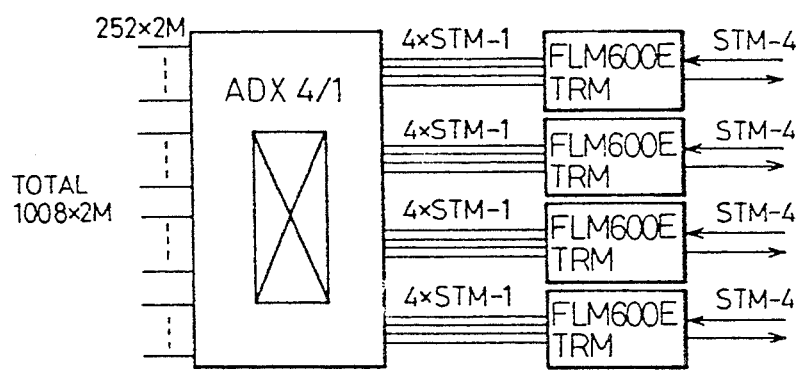

FIG. 9A represents application of the ADX as a Terminal Multiplexer in which 4×STM-1 lines from four FLM 600E TRM units are demultiplexed down to primary rate of 2 MBit/s.

Figure 9B:
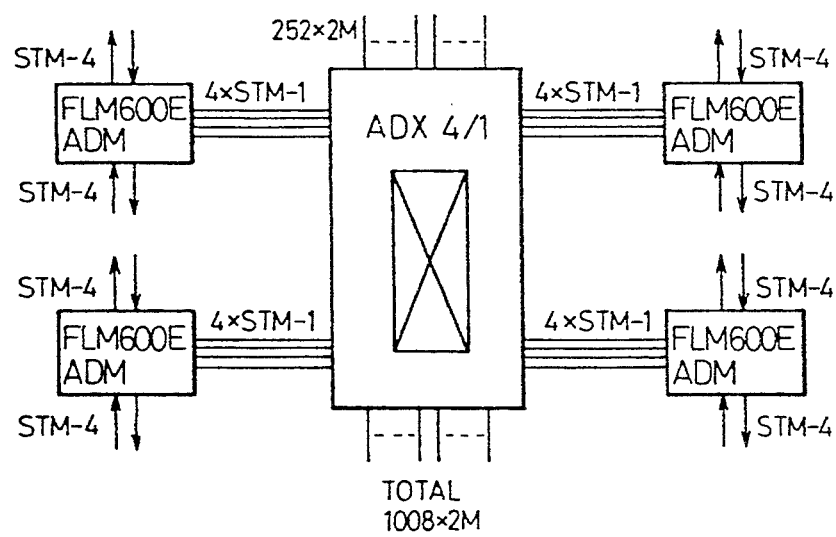

FIG. 9B represents application of the ADX as an Add/Drop Cross Connect in which 4×STM-1 lines from FLM 2400E ADM units are demultiplexed down to primary rate of 2 MBit/s. In this application any of the 2 MBit/s channels within the main STM-4 lines (Rings) can be accessed through the ADX.

Figure 9C:
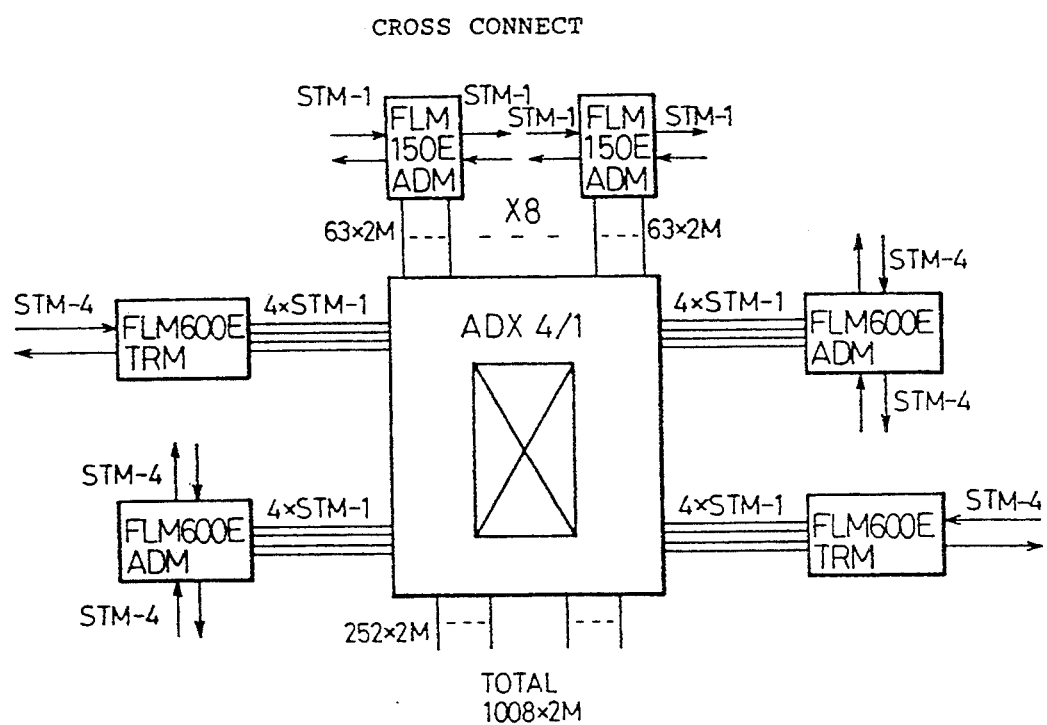

FIG. 9C represents application of the ADX as a Cross Connect in which 4×STM-1 lines from each of the FLM 600E units are demultiplexed down to primary rate of 2 MBit/s, and any of the 2 MBit/s channels within the 4×STM-1 frames of the main STM-4 lines can be accessed through the ADX. The traffic from the FLM 600E units can also be cross connected to 8 STM-1 lines (rings) connected to the ADX through FLM 150E's using 2 MBit/s interfaces.

FIG. 10 illustrates some application examples of how the ADX 4/1 can be used in conjunction with Fujitsu's FLM 150E range of line transmission equipments for SDH.

Figure 10A:
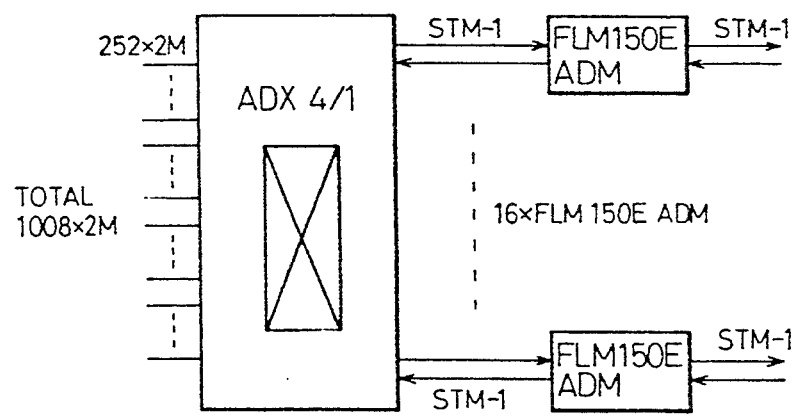

FIG. 10A represents application of the ADX as a Terminal Multiplexer in which 16×STM-1 lines from sixteen FLM 150E TRM units are demultiplexed down to primary rate of 2 MBit/s.

Figure 10B:
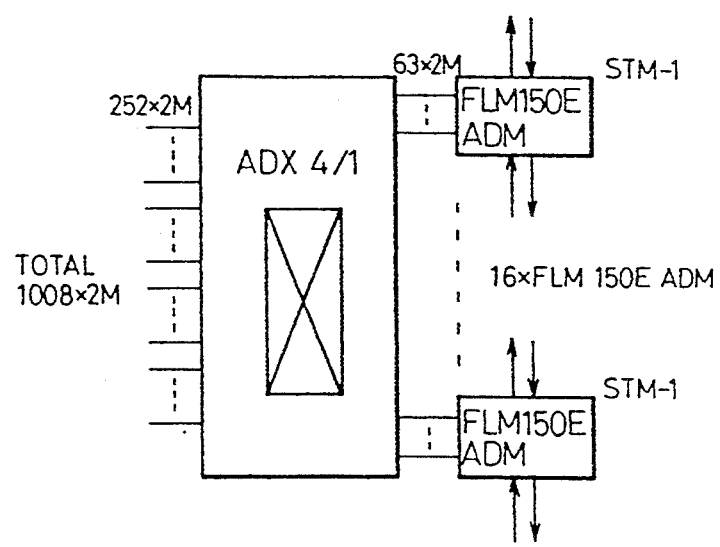

FIG. 10B represents application of the ADX as an Add/Drop Cross Connect in which 16×STM-1 lines from FLM 150E ADM units are demultiplexed down to primary rate of 2 MBit/s. In this application any of the 2 MBit/s channels within the main STM-1 lines (rings) can be accessed through the ADX.

Figure 10C:
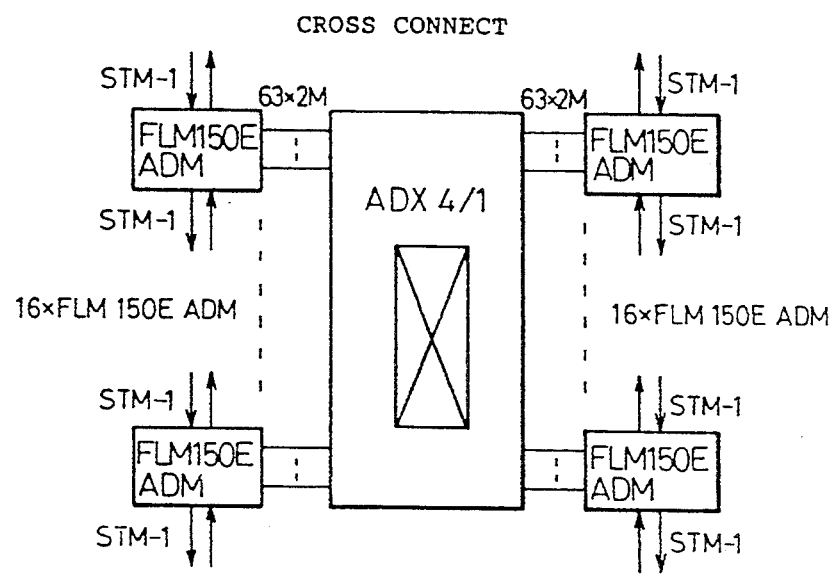

FIG. 10C represents application of the ADX as a Cross Connect in which 16×STM-1 lines from each of the FLM 150E ADMs are demultiplexed down to primary rate of 2 MBit/s, and any of the 2 MBit/s channels within the STM-1 frames of the main STM-1 lines can be accessed through the ADX. The traffic from the FLM 150E units can also be cross connected between 32 STM-1 lines (rings) connected to the ADX through FLM 150E's using 2 MBit/s interfaces.

In FIGS. 8, 9, and 10 so far described only STM-1 TRM and 2 MBit/s interface units of the ADX were used. In the following examples further units are introduced. These are STM-1 AD, STM-4 TRM and STM-4 AD interface units. This is more integrated systems approached and it can be seen that many of the previous functions can be carried out without the use of the FLM range of equipments.

FIG. 11 illustrates some application examples of how the ADX 4/1 can be used with STM-1 AD, STM-4 TRM and STM-4 AD interface units.

Figure 11B:
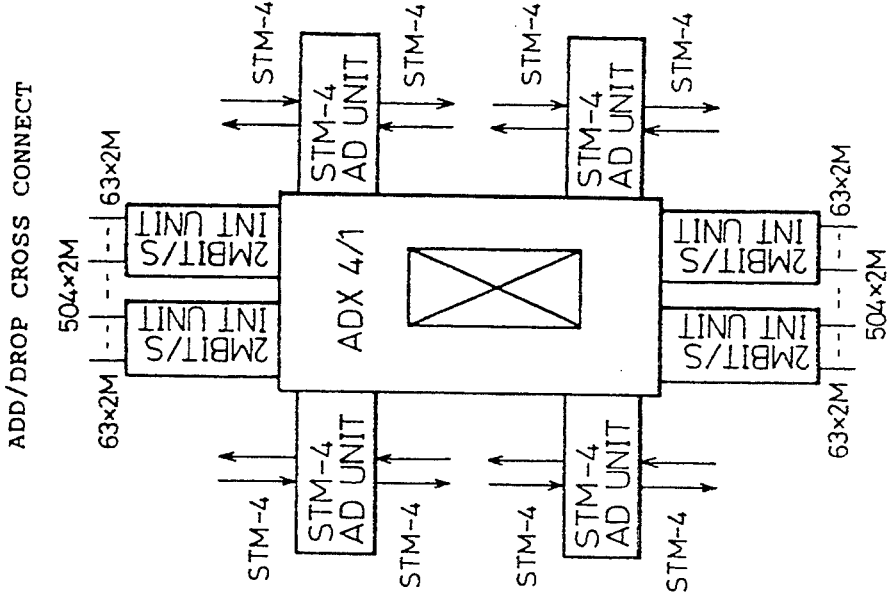
FIGS. 11A to 12C are block diagrams illustrating the manner in which Add/Drop Cross Connect equipment embodying the present invention can be used in conjunction with other examples of SDH line transmission equipment.
Figure 11A:
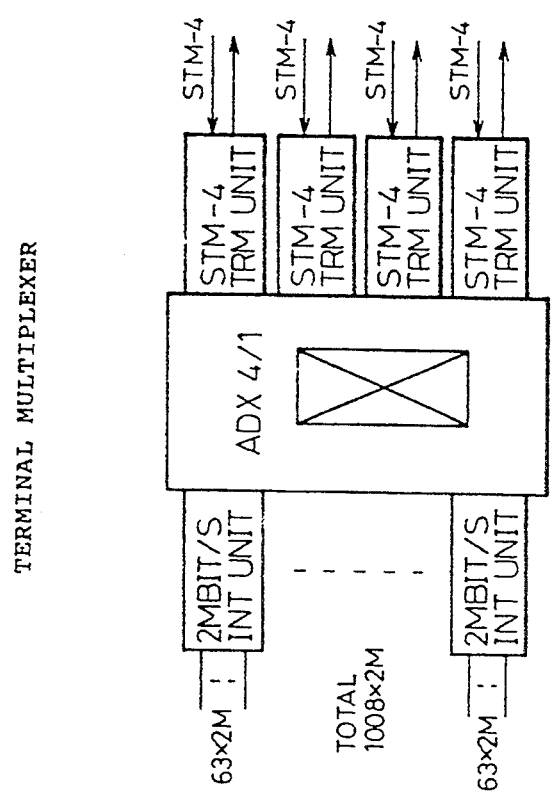

FIG. 11A represents application of the ADX as a Terminal Multiplexer in which 4×STM-1 lines are demultiplexed down to primary rate of 2 MBit/s.

FIG. 11B represents application of the ADX as an Add/Drop cross connect in which 4×STM-4 lines are demultiplexed down to primary rate of 2 MBit/s. In this application any of the 2 MBit/s channels within the main STM-4 lines (rings) can be accessed through the ADX.

Figure 11C:
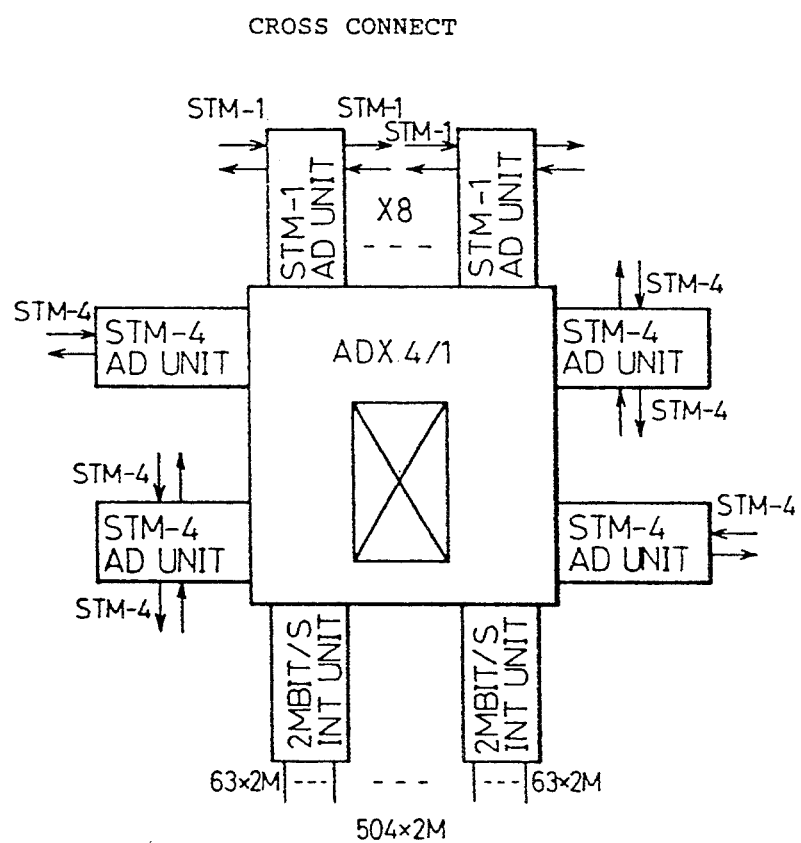

FIG. 11C represents application of the ADX as a Cross Connect in which 4×STM-4 lines are demultiplexed down to primary rate of 2 MBit/s, and any of the 2 MBit/s channels within the 4×STM-1 frames of the main STM-4 lines can be accessed through the ADX. The traffic from the STM-4 lines can also be cross connected to 8 STM-1 lines (rings) connected to the ADX through the STM-1 AD interfaces.

FIG. 12 illustrates some application examples of how the ADX 4/1 can be used in conjunction with Fujitsu's FLM 150E range of line transmission equipments for SDH.

Figure 12A:
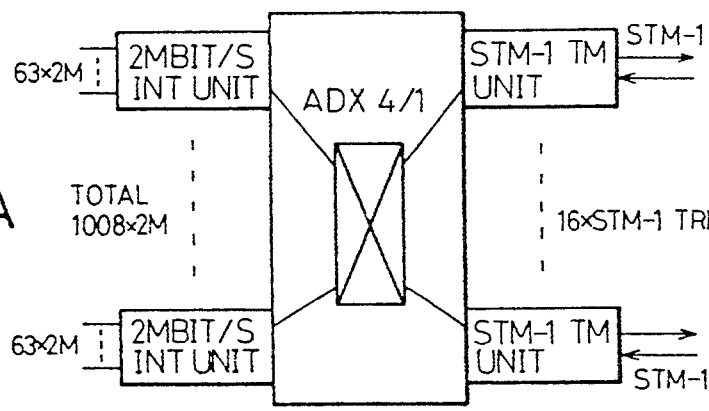

FIG. 12A represents application of the ADX as a Terminal Multiplexer in which 16×STM-1 lines from sixteen FLM 150E TRM units are demultiplexed down to primary rate of 2 MBit/s.

Figure 12B:
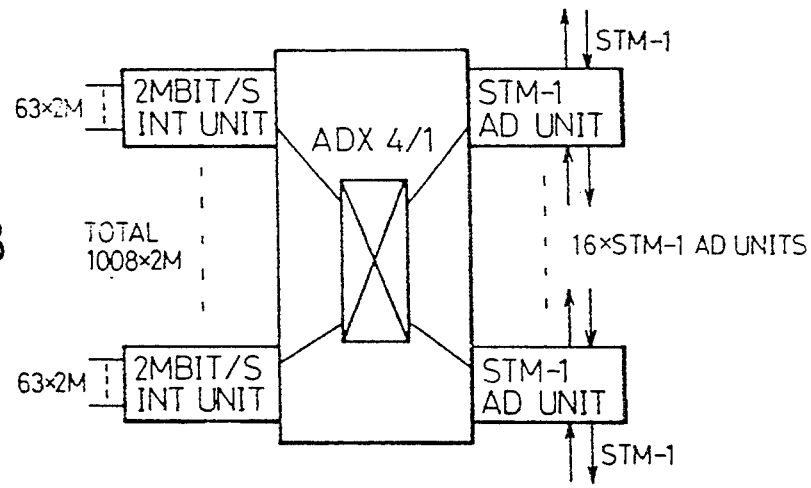

FIG. 12B represents application of the ADX as an Add/Drop Cross Connect in which 16×STM-1 lines from the FLM 150E ADM units are demultiplexed down to primary rate of 2 MBit/s. In this application any of the 2 MBit/s channels within the main STM-1 line (rings) can be accessed through the ADX.

Figure 12C:
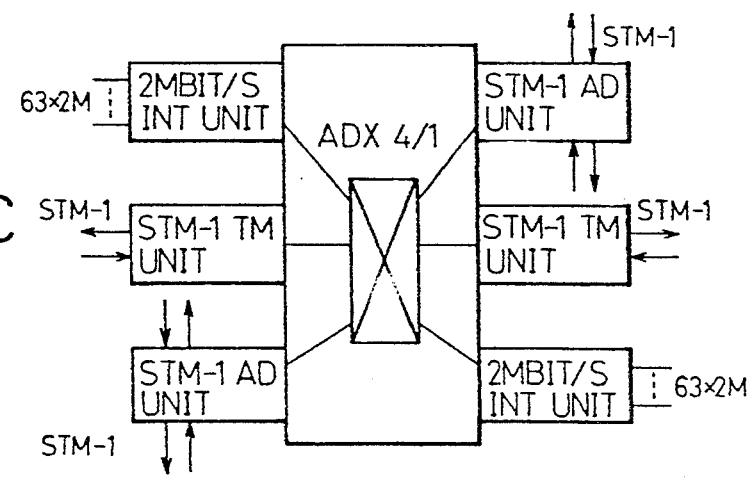

FIG. 12C represents application of the ADX as a Cross Connect in which 16×STM-1 lines from each of the FLM 150E ADMs are demultiplexed down to primary rate of 2 MBit/s, and any of the 2 MBit/s channels within the STM-1 frames of the main STM-1 lines can be accessed through the ADX. The traffic from the FLM 150E units can be cross connected between 32 STM-1 lines (rings) connected to the ADX through the FLM 150E's using 2 MBit/s interfaces.

It is important to note that while the drawings refer to a certain size of cross connect switch this is of no consequence to the real concept behind ADX and this equipment might be produced with varying sizes. The equipment is upgradeable according to network application requirements.

Furthermore, the equipment has the ability to handle the following interfaces:

1.5 MBit/s, 2 MBit/s, 34 MBit/s, 45 MBit/s interfaces as defined by CCITT recommendations.
140 MBit/s PDH Interfaces
STM-1 with electrical and optical interfaces
STM-4 with optical interfaces.

FIG. 13 illustrates the application of the ADX as a gateway node for local, regional and national network traffic. In this example traffic from the trunk national network is accessed via an FLM 2400E ADM. 8×STM-1 channels from the main STM-16 line (ring) are demultiplexed down to STM-1 tributaries which in turn are then connected to the ADX via 8 STM-1 Tributary Terminal units. The STM-1 tributaries are then demultiplexed down to the primary rate and appropriate paths set up to any of the ADX Tributary units serving the regional and local networks and vice versa. Transmission traffic from the local network can be directed to other tributaries in the local network or to regional or national network and vice versa.

FIG. 14 shows an example for the use of ADX in interconnection of ring network traffic and also connection to other network elements. In this example an ADX connects two STM-4 ring traffics to each other and to a central office switch. Other ADX equipments are used at different nodes as illustrated for flexible interconnection of traffic from the STM-1 local loop, and other network elements as illustrated.

FIG. 15 illustrates the application of ADX for connection of three ring networks to central office switching equipments and to each other using STM-1 and STM-4 Add/Drop interfaces. The reference numeral 80 denotes the FLM 150E Add/Drop Multiplexer, the reference numeral 82 denotes an STM-4 Add/Drop Optical unit, the reference numeral 84 denotes an STM-1 Add/Drop Optical unit, and the reference numeral 86 denotes a 2 MBit/s G.703 Interface unit. The traffic collected by loop 88 and loop 90 can be connected to the central switching equipment at any of the nodes 92, 94, or 96. It can also be connected to any other node as a leased line circuit.

I claim:

1. Digital cross-connection apparatus, for interconnecting first and second communications networks having respective first and second pluralities of data channels, information data and communications management data of the channels in each network being multiplexed together therein, which apparatus comprises:
- an add/drop unit, connected to said first communications network and operable selectively to extract therefrom data of a selected channel of said first plurality, and
- a digital switching matrix having an output connected to said second communications network and having an input connected to said add/drop unit for receiving therefrom extracted data including management data from said first communications network, said extracted management data passing through said switching matrix to said second communication network so that end-to-end path monitoring between the two networks is facilitated.

2. Digital cross connect apparatus for interconnecting first and second communications networks carrying respectively first and second data streams including first and second pluralities of data channels, which apparatus comprises:
- first add/drop means for interposition in the first communications network;
- second add/drop means for interposition in the second communications network; and
- switching means connected between said first and second add/drop means for passing data therebetween;
- said first add/drop means being operable to selectively drop from the first data stream data of a preselected data channel of said first plurality, which dropped data is passed via said switching means to said second add/drop means for addition thereby to said second data stream; and
- said second add/drop means being operable to selectively drop from the second data stream data of a preselected data channel of said second plurality, which dropped data is passed via said switching means to said first add/drop means for addition thereby to said first data stream;
- the apparatus being such that management information relating to the dropped channels of said first and second data streams is maintained and passes through said switching means, so that path continuity for said channels is preserved, whereby end-to-end path monitoring of each network is facilitated.

3. Digital cross connect apparatus for interconnecting respective first and second communication networks, comprising:
- first interface means for communication to said first communication network to receive a data stream carried thereby, which data stream includes respective first data items corresponding respectively to a first plurality of data channels, and operable to process the received data stream to derive therefrom said respective first data items;
- first time slot assignment means connected to said first interface means for receiving therefrom each of said first data items and having storage means for storing a set of the received first data items, said first time slot assignment means being operable selectively to pass to an output port thereof a preselected one of the stored first data items which is to be transmitted to said second communication network, and operable also to receive at an input port thereof a replacement first data item and to store said replacement first data item in said storage means in place of said preselected first data item;
- second interface means connected to said first time slot assignment means for receiving therefrom the stored set of first data items and operable to process said first data items to form a modified data stream for application to said first communication network;
- third interface means for connection to said second communication network to receive a data stream carried thereby, which data stream includes respective second data items corresponding respectively to a second plurality of data channels, and operable to process the received data stream to derive therefrom said respective second data items;
- second time slot assignment means connected to said third interface means for receiving therefrom each of said second data items and having storage means for storing a set of the received second data items, said second time slot assignment means being operable selectively to pass to an output port thereof a preselected one of the stored second data items which is to be transmitted to said first communication network, and operable also to receive at an input port thereof a replacement second data item and to store said replacement second data item in said storage means in place of the preselected second data item;
- fourth interface means connected to said second time slot assignment means for receiving therefrom the stored set of second data items and operable to process said second data items to form a modified data stream for application to said second communication network; and
- switching means connected to said first and second time slot assignment means for selectively establishing a connection between said output port of said first time slot assignment means and said input port of said second time slot assignment means and between said output port of said second time slot assignment means and said input port of said first time slot assignment means, thereby to permit passage, via said switching means, of the preselected first and second data items, including management information thereof, between the two time slot assignment means to serve respectively as said replacement second and first data items.

4. An add/drop cross connect apparatus for interconnecting first and second communication path each transporting virtual containers containing information data and path overheads for monitoring transportation of the corresponding virtual containers, comprising:
- first add/drop means for adding and dropping preselected virtual containers to and from the first communication path, respectively, without disassembling the added virtual containers and the dropped virtual containers;
- second add/drop means for adding and dropping preselected virtual containers to and from the second communication path, respectively, without disassembling the added virtual containers and the dropped virtual containers; and
- cross connection means for switching the virtual containers dropped by the first and the second add/drop means and the virtual containers to be added by the first and the second add/drop means, to thereby allow cross connection between preselected parts of the first and the second communication paths.

5. An add/drop cross connect apparatus as claimed in claim 4, further comprising:

first interface means for providing an interface between the cross connect means and a third communication path transporting information data not accompanied by the path overhead, to thereby allow cross-connection between the third communication path and other communication path associated with the cross connect means; and second interface means for providing an interface between the cross connect means and a fourth communication path transporting virtual containers containing information data and the path overheads, to thereby allow cross-connection between the fourth communication path and another communication path associated with the cross connect means.

6. An add/drop cross connect apparatus as claimed in claim 4, wherein the first add/drop means includes:

first transport terminal means, connected to one end of the first communication path, for terminating the first communication path and for receiving and sending the virtual containers;

second transport terminal means, connected to other end of the first communication path, for terminating the first communication path and for receiving and sending the virtual containers; and first time slot assignment means, connected to the first and the second transport terminal means and to the cross connect means, for connecting the first and the second transport terminal means with each other, for adding and dropping the preselected virtual containers between the first and second transport terminal means, for receiving the virtual containers to be added from the cross connect means, and for sending the dropped virtual containers to the cross connect means, and wherein the second and/drop means includes:

third transport terminal means connected to one end of the second communication path, for terminating the second communication path and for receiving and sending the virtual containers;

fourth transport terminal means, connected to other end of the second communication path and for receiving and sending the virtual containers; and second time slot assignment means, connected to the third and the fourth transport terminal means and to the cross connect means, for connecting the third and the fourth transport terminal means with each other, for adding and dropping the preselected virtual containers between the third and fourth transport terminal means, for receiving the virtual containers to be added from the cross connect means, and for sending the dropped virtual containers to the cross connect means.

7. An add/drop cross connect apparatus as claimed in claim 6, wherein the first time slot assignment means include a first path connection unit, connected to the first and the second transport terminal means, for providing flexible interconnection among the virtual containers transported on the first communication path, the added virtual containers and the dropped virtual containers, and wherein the second time slot assignment means include a second path connection unit, connected to the third and the fourth transport terminal means, for providing flexible interconnection among the virtual containers transported on the second communication path, the added virtual containers and the dropped virtual containers.

* * * * *